United States Patent
Ihara et al.

(10) Patent No.: US 12,203,018 B2
(45) Date of Patent: Jan. 21, 2025

(54) ORGANOPOLYSILOXANE COMPOSITION FOR USE IN RELEASE PAPER OR RELEASE FILM

(71) Applicant: SHIN-ETSU CHEMICAL CO., LTD., Tokyo (JP)

(72) Inventors: Toshiaki Ihara, Annaka (JP); Kenji Tanaka, Annaka (JP); Ataru Kobayashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 716 days.

(21) Appl. No.: 17/421,052

(22) PCT Filed: Dec. 25, 2019

(86) PCT No.: PCT/JP2019/050916
§ 371 (c)(1),
(2) Date: Jul. 7, 2021

(87) PCT Pub. No.: WO2020/145151
PCT Pub. Date: Jul. 16, 2020

(65) Prior Publication Data
US 2022/0056323 A1 Feb. 24, 2022

(30) Foreign Application Priority Data

Jan. 8, 2019 (JP) .................................. 2019-001141

(51) Int. Cl.
*C08L 83/04* (2006.01)
*C09J 7/40* (2018.01)

(52) U.S. Cl.
CPC .............. *C09J 7/401* (2018.01); *C09J 7/405* (2018.01); *C08L 83/04* (2013.01); *C09J 2400/28* (2013.01); *C09J 2483/005* (2013.01)

(58) Field of Classification Search
CPC ...................................................... C08L 83/04
USPC ............................................. 528/15, 31, 32
See application file for complete search history.

(56) References Cited

U.S. PATENT DOCUMENTS

| | | | |
|---|---|---|---|
| 4,201,808 A | 5/1980 | Cully et al. | |
| 4,701,503 A * | 10/1987 | Sato | ........................ C08L 83/04 524/588 |
| 2019/0092951 A1* | 3/2019 | Wang | ................... C09D 11/102 |
| 2020/0048508 A1 | 2/2020 | Onozawa et al. | |

FOREIGN PATENT DOCUMENTS

| | | | | |
|---|---|---|---|---|
| EP | 0 576 984 A2 | 1/1994 | | |
| EP | 2444463 A1 * | 4/2012 | ............. | C08L 83/00 |
| EP | 2 444 463 B1 | 10/2017 | | |
| JP | 35-13709 | 9/1960 | | |
| JP | 47-32072 | 11/1972 | | |
| JP | 54-162787 A | 12/1979 | | |
| JP | 6-16941 A | 1/1994 | | |
| JP | 7-118537 A | 5/1995 | | |
| JP | 2012-246359 A | 12/2012 | | |
| WO | WO 2018/066448 A1 | 4/2018 | | |

OTHER PUBLICATIONS

International Search Report, issued in PCT/JP2019/050916, dated Mar. 17, 2020.
Written Opinion of the International Searching Authority, issued in PCT/JP2019/050916, dated Mar. 17, 2020.
Extended European Search Report for European Application No. 19909032.5 dated Sep. 9, 2022.

* cited by examiner

*Primary Examiner* — Margaret G Moore
(74) *Attorney, Agent, or Firm* — Birch, Stewart, Kolasch & Birch, LLP

(57) ABSTRACT

In the present invention, compounding an addition-reaction-curable organopolysiloxane composition with a specific amount of an organopolysiloxane compound that has three or more (meth)acryl groups in the molecule and a weight-average molecular weight of 1,000 or greater yields an organopolysiloxane composition for use in a release paper or release film in which addition reactions can occur using a small amount of platinum family metal catalyst, cured films can be formed having a peeling strength approximating levels encountered in the past, and addition-reaction-prompted curing will proceed even on a base material containing a catalyst-poisoning component.

7 Claims, No Drawings

ORGANOPOLYSILOXANE COMPOSITION FOR USE IN RELEASE PAPER OR RELEASE FILM

TECHNICAL FIELD

This invention relates to an organopolysiloxane composition of addition reaction cure type for release paper or release film which can be cured with a minor amount of platinum.

BACKGROUND ART

In the prior art approach for preventing adhesion or bond between sheet-like substrates such as paper and plastic sheets and pressure-sensitive adhesives, a cured film of an organopolysiloxane composition is disposed on the substrate surface to impart release properties. The following methods are known for forming a cured organopolysiloxane film on the substrate surface.
  (1) method for forming a releasable film through addition reaction between an alkenyl-containing organopolysiloxane and an organohydrogenpolysiloxane in the presence of a platinum base compound catalyst (Patent Document 1: JP-A S47-032072)
  (2) method for forming a releasable film through condensation reaction of an organopolysiloxane having a functionality such as hydroxy or alkoxy in the presence of an organometallic salt catalyst (Patent Document 2: JP-B S35-013709)
  (3) method for forming a releasable film by effecting radical polymerization of an acrylic group-containing organopolysiloxane using a photoinitiator and UV or electron beam (Patent Document 3: JP-A S54-162787)

Among the above methods (1), (2) and (3), method (1) for forming a releasable film through addition reaction in the presence of a platinum catalyst is widely utilized because of effective cure and because it can accommodate a variety of requisite release properties covering from low-speed release to high-speed release.

In the prior art, the platinum group metal base catalyst is often used in a concentration of 60 to 400 ppm by weight of platinum group metal based on the release paper or film-forming organopolysiloxane composition. The reason is that if the platinum concentration is less than 60 ppm by weight, cure reaction does not take place to a full extent so that the cured film becomes soft, the amount of residual Si—H groups becomes more so that the release force becomes high, and the unreacted raw material, organopolysiloxane remains and becomes a migrating component so that the organopolysiloxane migrates to the pressure-sensitive adhesive surface to be attached to release paper, to incur a drop of adhesive force.

Further, the platinum group metals are expensive because they are noble metals which are rare on the earth. The platinum catalyst accounts for a large proportion in the manufacture cost of release paper or release film. Therefore, reducing the platinum group metal base catalyst leads to a lower price.

In addition, some substrates contain components which can poison the platinum group metal base catalysts, such as nitrogen, sulfur and phosphorus compounds. It is a problem that the catalyst poison components bond to the platinum group metal to inhibit the progress of cure via addition reaction.

PRIOR ART DOCUMENTS

Patent Documents

Patent Document 1: JP-A S47-032072
Patent Document 2: JP-B S35-013709
Patent Document 3: JP-A S54-162787

SUMMARY OF INVENTION

Technical Problem

An object of the invention, which has been made under the above-mentioned circumstances, is to provide a release paper or film-forming organopolysiloxane composition which is capable of addition reaction with a minor amount of a platinum group metal base catalyst, can form a cured film having a release force comparable to the prior art level, and allows for the progress of cure via addition reaction even on a substrate containing a catalyst poison.

Solution to Problem

Making extensive investigations to attain the above object, the inventors have found that the outstanding problems can be solved by blending an organopolysiloxane composition of addition reaction cure type with (C) an organopolysiloxane compound having at least three (meth) acrylic groups per molecule and a weight average molecular weight of at least 1,000.

Accordingly, the invention provides an organopolysiloxane composition for release paper or film (sometimes simply referred to as "organopolysiloxane composition," hereinafter) as defined below.

1.
An organopolysiloxane composition for release paper or release film comprising the following components (A) to (D):
  (A) an organopolysiloxane having at least two silicon-bonded alkenyl groups per molecule, but not at least three (meth)acrylic groups,
  (B) an organohydrogenpolysiloxane having on the average at least two silicon-bonded hydrogen atoms (i.e., Si—H groups) per molecule, but not at least three (meth)acrylic groups, in such an amount that the moles of Si—H groups in component (B) is 1 to 5 times the moles of alkenyl groups in component (A),
  (C) an organopolysiloxane compound having at least three (meth)acrylic groups per molecule and a weight average molecular weight of at least 1,000, in an amount of 0.01 to 5 parts by weight per 100 parts by weight of component (A), and
  (D) a platinum group metal base catalyst in an amount to give a platinum concentration of 1 to 100 ppm by weight based on the total weight of components (A), (B), (C), and (D).

2.
The organopolysiloxane composition of 1, further comprising (E) 0.01 to 5 parts by weight per 100 parts by weight of component (A) of a reaction inhibitor.

3.
The organopolysiloxane composition of 1 or 2 wherein component (C) is an organopolysiloxane compound having at least three (meth)acrylic groups on side chains.

4. The organopolysiloxane composition of any one of 1 to 3 wherein component (C) is an organopolysiloxane compound having at least 5 (meth)acrylic groups per molecule.

5. The organopolysiloxane composition of any one of 1 to 4 wherein the platinum group metal base catalyst (D) is contained in an amount to give a platinum concentration of 1 to 60 ppm by weight based on the total weight of components (A), (B), (C), and (D).

6. The organopolysiloxane composition of any one of 1 to 4 wherein the platinum group metal base catalyst (D) is contained in an amount to give a platinum concentration of 1 to 40 ppm by weight based on the total weight of components (A), (B), (C), and (D).

Advantageous Effects of Invention

The invention provides an organopolysiloxane composition for release paper or film which is capable of addition reaction with a minor amount of a platinum group metal base catalyst and can form a cured film having a release force comparable to the prior art level. This enables to form a cured film of silicone even under the conditions that hinder cure in the prior art, leads to a substantial reduction of manufacture cost, and enables to form a cured film via addition reaction even on a substrate containing a catalyst poison.

DESCRIPTION OF EMBODIMENTS

Now the invention is described in detail.

[Component (A)]

Component (A) is an organopolysiloxane having at least two, preferably 2 to 50 silicon-bonded alkenyl groups per molecule, but not at least three (meth)acrylic groups (that is, exclusive of component (C) to be described later), which may be used alone or in combination of two or more.

Typical of component (A) is an organopolysiloxane having a structure of the following formula (1).

$$M_\alpha M^{vi}_\beta D_\gamma D^{vi}_\delta T_\varepsilon T^{vi}_\zeta Q_\eta \quad (1)$$

Herein M is $R_3SiO_{1/2}$, $M^{vi}$ is $R_2PSiO_{1/2}$, D is $R_2SiO_{2/2}$, $D^{vi}$ is $RPSiO_{2/2}$, T is $RSiO_{3/2}$, $T^{vi}$ is $PSiO_{3/2}$, Q is $SiO_{4/2}$, R is each independently a $C_1$-$C_{12}$ substituted or unsubstituted monovalent hydrocarbon group free of aliphatic unsaturation, P is an alkenyl group of the formula: —$(CH_2)_n$—CH=$CH_2$ wherein n is an integer of 0 to 6, $\alpha$, $\beta$, $\delta$ and $\zeta$ are each independently 0 or a positive number, not all $\beta$, $\delta$ and $\zeta$ are 0 at the same time, $2 \leq \beta+\delta+\zeta \leq 500$, $\gamma$ is a positive number of 10 to 27,000, $\varepsilon$ is a positive number of 0 to 200, and $\eta$ is a positive number of 0 to 1,000.

In formula (1), R is each independently a substituted or unsubstituted monovalent hydrocarbon group of 1 to 12 carbon atoms, preferably 1 to 10 carbon atoms, more preferably 1 to 8 carbon atoms, free of aliphatic unsaturation. Examples include alkyl groups such as methyl, ethyl, propyl, butyl, pentyl, hexyl, octyl, decyl and dodecyl, cycloalkyl groups such as cyclohexyl, aryl groups such as phenyl, naphthyl and tolyl, aralkyl groups such as benzyl and phenethyl, and substituted forms of the foregoing in which some carbon-bonded hydrogen atoms are substituted by halogen, epoxy, amino, polyether, cyano or hydroxy groups. Among others, methyl preferably accounts for at least 80 mol % of the overall R in view of keeping the composition curable and reducing the release force of the cured product.

P is an alkenyl group of the formula: —$(CH_2)_n$—CH=$CH_2$ wherein n is an integer of 0 to 6, examples of which include vinyl, allyl, butenyl, propenyl, 5-hexenyl, and octenyl, with vinyl being preferred.

In formula (1), $\alpha$, $\beta$, $\delta$ and $\zeta$ are each independently 0 or a positive number, $\beta$, $\delta$ and $\zeta$ are not equal to 0 at the same time, $2 \leq \beta+\delta+\zeta \leq 500$, preferably $2 \leq \beta+\delta+\zeta \leq 200$, $\alpha$ is preferably 0 or a positive number of 1 to 100, $\beta$ is preferably 0 or a positive number of 1 to 100, $\alpha+\beta$ is preferably a positive number of 2 to 200, $\delta$ is preferably 0 or a positive number of 1 to 500, and $\zeta$ is preferably 0 or a positive number of 1 to 100.

Also, $\gamma$ is a positive number of 10 to 27,000, preferably a positive number of 10 to 20,000, more preferably a positive number of 50 to 15,000. If $\gamma$ is less than 10, a more amount of mist is generated when the coating speed exceeds 200 m/min with the risk that the coating surface of the organopolysiloxane composition is roughened. If $\gamma$ exceeds 27,000, the organopolysiloxane composition has too high a kinematic viscosity and becomes inefficient to coat so that the coating may be aggravated in smoothness and largely vary in coating weight locally.

Also, $\varepsilon$ is a positive number of 0 to 200, preferably a positive number of 0 to 20, more preferably a positive number of 0 to 10, and $\eta$ is a positive number of 0 to 1,000, preferably a positive number of 0 to 10, more preferably a positive number of 0 to 5.

Component (A) should preferably have a vinyl value of 0.001 to 0.7 mol/100 g, more preferably 0.005 to 0.5 mol/100 g, and even more preferably 0.01 to 0.1 mol/100 g. If the vinyl value is less than 0.001 mol/100 g, less reaction sites may be available, leading to a cure failure. If the vinyl value exceeds 0.7 mol/100 g, the crosslinking density may become too high, the low-speed release force become too high, or peeling become difficult.

Component (A) preferably has a weight average molecular weight (Mw) of from 800 to 300,000, more preferably from 3,000 to 280,000. If the Mw of component (A) is less than 800, there is a risk that the coating weight on the substrate becomes insufficient. If the Mw exceeds 300,000, there is a risk that working becomes inefficient. As used herein, the Mw is measured by gel permeation chromatography (GPC) versus polystyrene standards using toluene solvent (the same holds true, hereinafter).

Component (A) preferably has a viscosity at 25° C. of from 7 mPa·s to a 30 wt % toluene solution viscosity (i.e., viscosity of a 30 wt % solution of organopolysiloxane in toluene) 70,000 mPa·s, more preferably from 50 mPa·s to a 30 wt % toluene solution viscosity 60,000 mPa·s. If the viscosity is less than 7 mPa·s, there is a risk that the coating weight becomes insufficient. If the 30 wt % toluene solution viscosity exceeds 70,000 mPa·s, there is a risk that working becomes inefficient.

Illustrative examples of component (A) include siloxanes containing alkenyl groups at both ends, siloxanes containing alkenyl groups on side chains, siloxanes containing alkenyl groups at one end and on side chains, siloxanes containing alkenyl groups at both ends and on side chains, and branched siloxanes containing alkenyl groups at ends.

Examples as expressed by structural formula include $M^{vi}_2D_\gamma$, $M_2D_\gamma D^{vi}_\delta$, $M^{vi}_3D_\gamma T_1$, $M^{vi}_4D_\gamma T_2$, $M^{vi}_2D_\gamma D^{vi}_6$, $M^{vi}_2D_\gamma Q_1$, and $M_\alpha D_\gamma D^{vi}_6 T^{vi}_\zeta$ wherein M, $M^{vi}$, D, $D^{vi}$, T, $T^{vi}$, Q, $\gamma$, $\delta$, and $\zeta$ are as defined in formula (1) (the same hereinafter). Illustrative structures include $M^{vi}_2D_{100}$, $M_2D_{97}D^{vi}{}_3$, $M_2D_{26}D^{vi}{}_4$, $M_2D_{96}D^{vi}{}_4$, $M_2D_{95}D^{vi}{}_5$, $M^{vi}{}_3D_{100}T_1$, $M^{vi}{}_4D_{100}T_2$, $M^{vi}{}_2D_{97}D^{vi}{}_1$, $M^{vi}{}_2D_{95}D^{vi}{}_3$, $M_3D_{93}D^{vi}{}_3T^{vi}{}_1$, $M^{vi}{}_2D_{20000}$, and $M_2D_{1000}D^{vi}{}_{20}$.

[Component (B)]

Component (B) is an organohydrogenpolysiloxane containing on the average at least two silicon-bonded hydrogen atoms (i.e., Si—H groups) per molecule, but not at least three (meth)acrylic groups (i.e., exclusive of component (C) to be described later), which may be used alone or in combination of two or more. An addition reaction takes place between Si—H groups on the organohydrogenpolysiloxane and alkenyl groups on component (A) to form a crosslinked organopolysiloxane.

The organohydrogenpolysiloxane as component (B) should preferably have 3 to 100, more preferably 10 to 80 silicon-bonded hydrogen atoms (Si—H groups) per molecule.

The content of Si—H groups is preferably 0.001 to 3.5 mol/100 g, more preferably 0.01 to 2.5 mol/100 g, even more preferably 0.02 to 2.0 mol/100 g. A less Si—H content may adversely affect curability and adhesion whereas an excessive content may cause a tightening of release force.

The organohydrogenpolysiloxane as component (B) preferably has a structure of the following formula (2).

Herein M is $R_3SiO_{1/2}$, $M^H$ is $R_2HSiO_{1/2}$, D is $R_2SiO_{2/2}$, $D^H$ is $RHSiO_{2/2}$, T is $RSiO_{3/2}$, $T^H$ is $HSiO_{3/2}$, Q is $SiO_{4/2}$, R is each independently a $C_1$-$C_{12}$ substituted or unsubstituted monovalent hydrocarbon group free of aliphatic unsaturation, o, π, ρ and τ are each independently 0 or a positive number, σ is a positive number of 0 to 100, φ is a positive number of 0 to 10, χ is a positive number of 0 to 10, π, σ and φ are not equal to 0 at the same time, and $2 \leq \pi+\sigma+\phi \leq 100$.

In formula (2), R is as exemplified above for R in formula (1), with $C_1$-$C_8$ alkyl groups being preferred.

In formula (2), o, π, ρ and τ are each independently 0 or a positive number, o is preferably 0 or a positive number of 1 to 10, π is preferably 0 or a positive number of 1 to 10, o+π is preferably a positive number of 2 to 12; ρ is preferably 0 or a positive number of 1 to 100, τ is preferably 0 or a positive number of 1 to 10. Also, σ is a positive number of 0 to 100, preferably 2 to 100, and more preferably 10 to 80, φ is a positive number of 0 to 10, preferably 0 to 5, χ is a positive number of 0 to 10, preferably 0 to 5, π, σ and φ are not equal to 0 at the same time, π+σ+φ is a positive number of 2 to 100, preferably 3 to 100, more preferably 10 to 80.

Illustrative examples of the organohydrogenpolysiloxane as component (B) include siloxanes containing hydrogensilyl groups at both ends, siloxanes containing hydrogensilyl groups on side chains, siloxanes containing hydrogensilyl groups at one end and on side chains, and siloxanes containing hydrogensilyl groups at both ends and on side chains.

Examples as expressed by structural formula include $M^H{}_2D_\rho$, $M_2D_\sigma$, $M_2D_\rho D^H{}_\sigma$, $M^H{}_2D_\rho D^H{}_\sigma$, $M^H{}_3D_\rho T_1$, $M^H{}_4D_\rho T_2$, and $M_o D_\rho D^H{}_\sigma T^H{}_\phi$ wherein M, $M^H$, D, $D^H$, T, $T^H$, Q, o, ρ, σ, and φ are as defined in formula (2) (the same hereinafter). Illustrative structures include $M^H{}_2D_{10}$, $M^H{}_2D_{100}$, $M_2D^H{}_{80}$, $M_2D_{27}D^H{}_3$, $M_2D_{97}D^H{}_3$, $M_2D_{26}D^H{}_4$, $M_2D_{25}D^H{}_5$, $M_2D_{24}D^H{}_6$, $M_2D_{96}D^H{}_4$, $M_2D_{95}D^H{}_5$, $M^H{}_3D_{100}T_1$, $M^H{}_4D_{100}T_2$, $M^H{}_2D_{97}D^H{}_1$, $M^H{}_2D_{95}D^H{}_3$, $M_3D_{93}D^H{}_3T^H{}_1$, $M_2D^H{}_{30}$, and $M^2D^H{}_{60}$.

Component (B) preferably has a weight average molecular weight (Mw) of 194 to 10,000, more preferably 874 to 5,000. If the Mw of component (B) is too low, the adhesion can be markedly aggravated. If the Mw is too high, sometimes reactivity becomes poor, and curability becomes low, resulting in a reduction of residual adhesion rate or an increase of release force due to under-cure.

Component (B) should preferably have a kinematic viscosity at 25° C. of 2 to 500 $mm^2$/s, more preferably 2 to 300 $mm^2$/s, even more preferably 5 to 200 $mm^2$/s as measured by an Ostwald viscometer. If the kinematic viscosity at 25° C. is less than 2 $mm^2$/s, the adhesion to substrates can be aggravated despite good reactivity due to a low molecular weight. If the kinematic viscosity exceeds 500 $mm^2$/s, sometimes reactivity becomes poor, and curability becomes low, resulting in a reduction of residual adhesion rate or an increase of release force due to under-cure.

Component (B) is blended in such an amount that the moles of Si—H groups in component (B) is 1 to 5 times, preferably 1.2 to 3 times the moles of alkenyl groups in component (A). If component (B) is too less, curability and adhesion become insufficient. If component (B) is too much, the amount of residual Si—H groups becomes more so that the release force becomes high, and the amount of Si—H groups decreases with time so that the release force lowers with time.

[Component (C)]

Component (C) is an organopolysiloxane compound having at least three, preferably 5 to 50 (meth)acrylic groups per molecule and a weight average molecular weight (Mw) of at least 1,000, which may be used alone or in combination of two or more.

The lower limit of Mw is preferably at least 1,022. The upper limit of Mw is preferably up to 20,000, more preferably up to 17,000. It is noted that the Mw of component (C) can be measured by $^{29}$Si-NMR spectroscopy.

Component (C) is preferably an organopolysiloxane having at least three (meth)acrylic groups on side chains, represented by the general formula (3).

Herein $M^1$ is $R^1{}_3SiO_{1/2}$, $M^{1A}$ is $R^1{}_2ASiO_{1/2}$, $D^1$ is $R^1{}_2SiO_{2/2}$, $D^{1A}$ is $R^1ASiO_{2/2}$, $T^1$ is $R^1SiO_{3/2}$, $T^{1A}$ is $ASiO_{3/2}$, and $Q^1$ is $SiO_{4/2}$. $R^1$ is each independently a $C_1$-$C_{18}$ unsubstituted or substituted monovalent hydrocarbon group, or alkoxy group, hydrogen, hydroxy group, epoxy group, or polyoxyalkylene group. "A" is $CH_2$=$CR^2COR^3$—, wherein $R^2$ is hydrogen or methyl, $R^3$ is $OR^4$ or $R^4$, $R^4$ is a $C_1$-$C_{20}$ divalent group which may have a branched or cyclic structure and may contain an epoxy group, ester bond, urethane bond, ether bond, isocyanate bond, or hydroxy group. The subscript "a" is an integer of 0 to 10, b is an integer of 0 to 5, b is an integer of 2 to 5 in case of a=0, and b is an integer of 1 to 5 in case of a=1; c is an integer of 5 to 300, d is an integer of 3 to 200, e and f each are an integer of 0 to 10, and g is 0 or 1.

In formula (3), $R^1$ is each independently a $C_1$-$C_{18}$ unsubstituted or substituted monovalent hydrocarbon group, or alkoxy group, hydrogen, hydroxy group, epoxy group, or polyoxyalkylene group, preferably such a group of 1 to 12 carbon atoms, more preferably of 1 to 8 carbon atoms. Exemplary monovalent hydrocarbon groups include alkyl groups such as methyl, ethyl, propyl, butyl, pentyl, hexyl, octyl, decyl and dodecyl; alkenyl groups such as vinyl, allyl, butenyl, propenyl, 5-hexenyl, octenyl and decenyl; cycloalkyl groups such as cyclohexyl; aryl groups such as phenyl, naphthyl and tolyl; aralkyl groups such as benzyl and phenethyl; and substituted forms of the foregoing groups in which some carbon-bonded hydrogen is substituted by halogen, epoxy, amino, polyether, cyano, hydroxy or the like. Exemplary alkoxy groups include methoxy, ethoxy, propoxy and butoxy. Exemplary polyoxyalkylene groups include polyoxyethylene and polyoxypropylene.

Also, "A" is $CH_2=CR^2COR^3$—.

Herein $R^2$ is hydrogen or methyl, with hydrogen being preferred. $R^3$ is $OR^4$ or $R^4$, wherein $R^4$ is a $C_1$-$C_{20}$ divalent group which may have a branched or cyclic structure and which may contain an epoxy group, ester bond, urethane bond, ether bond, isocyanate bond, or hydroxy group. Exemplary of $R^4$ are divalent hydrocarbon groups including straight alkylene groups such as methylene, ethylene, propylene, butylene, hexamethylene, octamethylene and decylene; branched alkylene groups such as methylethylene and methylpropylene; cyclic alkylene groups such as cyclohexylene; akenylene groups such as propenylene; arylene groups such as phenylene; and aralkylene groups such as methylenephenylene and methylenephenylenemethylene. These divalent hydrocarbon groups may be separated by an ester bond, urethane bond, ether bond, or isocyanate bond. A combination of the foregoing groups may also be used. In these divalent hydrocarbon groups, some or all of the hydrogen atoms may be substituted by epoxy or hydroxy groups. Among others, $R^4$ is preferably a propylene group.

In formula (3), "a" is an integer of 0 to 10, b is an integer of 0 to 5, b is an integer of 2 to 5 in case of a=0, and b is an integer of 1 to 5 in case of a=1; a is preferably 2 or 3, and in this case, b is preferably 0.

The subscript c is an integer of 5 to 300, preferably 5 to 200, more preferably 15 to 180.

The subscript d is an integer of 3 to 200, preferably 3 to 50, more preferably 3 to 30. If d is less than 3, reducing the amount of the catalyst can lead to a lowering of cure. Also a value of d in excess of 200 can lead to a lowering of cure.

The subscripts e and f each are an integer of 0 to 10, preferably 0 to 6, more preferably 0 to 3. A value of e in excess of 10 can lead to a lowering of cure for an indefinite reason.

The subscript g is 0 or 1. A value of g in excess of 1 is undesirable because of an excessive viscosity buildup and tightening of release force.

Examples of the organopolysiloxane compound having at least three (meth)acrylic groups and a Mw of at least 1,000 include the following:
$M^2_2D^2_5D^{2A}_3$, $M^2_2D^2_{20}D^{2A}_5$, $M^{2Vi}_2D^2_{20}D^{2A}_5$, $M^2_2D^2_{30}D^{2A}_7$, $M^{2\Phi}_2D^2_{30}D^{2A}_7$, $M^2_2D^2_{25}D^{2\Phi}_5D^{2A}_7$, $M^2_2D^2_{65}D^{2A}_{15}$, $M^{2Vi}_2D^2_{65}D^{2A}_{15}$, $M^2_2D^2_{61}D^{2OH}_4D^{2A}_{15}$, $M^2_2D^2_{63}D^{2OSiR'}_2D^{2A}_{15}$, $M^{2H}_2D^2_{65}D^{2A}_{15}$, $M^2_1M^{2A}_1D^2_{10}D^{2A}_3$, $M^{2OSiR'}_2D^2_{20}D^{2A}_{15}$, $M^2_2D^2_{20}D^{2A}_5$, $M^2_2D^2_{32}D^{2A}_5$, $M^{2A}_2D^2_{37}D^{2A}_8$, $M^2_3D^2_{20}D^{2A}_5T^2_1$, $M^2_3D^2_{110}D^{2A}_6T^2_1$, $M^2_2D^2_{170}D^{2A}_{22}$, $M^2_2D^2_{170}D^{2A}_{20}Q^2_1$, and $M^2_3D^2_{180}D^{2A}_{18}T^2_1$, wherein $M^2$ is $R^5_3SiO_{1/2}$, $M^{2A}$ is $R^5_2ASiO_{1/2}$, $D^2$ is $R^5_2SiO_{2/2}$, $D^{2A}$ is $R^5ASiO_{2/2}$, $T^2$ is $R^5SiO_{3/2}$, $M^{2Vi}$ is $R^5_2(CH_2=CH)SiO_{1/2}$, $M^{2\Phi}$ is $R^5_2(C_6H_5)SiO_{1/2}$, $D^{2\Phi}$ is $R^5(C_6H_5)SiO_{2/2}$, $M^{2H}$ is $R^5_2(H)SiO_{1/2}$, $D^{2OH}$ is $R^5(OH)SiO_{2/2}$, $M^{2OSiR'}$ is $R^5_2(OSiR^6_3)SiO_{1/2}$, $D^{2OSiR'}$ is $R^5(OSiR^6_3)SiO_{2/2}$, $R^5$ and $R^6$ each are a $C_1$-$C_6$ alkyl group such as methyl or ethyl, $(C_6H_5)$ stands for phenyl, Q and A are as defined in formula (3).

The amount of component (C) blended is 0.01 to 5 parts by weight, preferably 0.1 to 2 parts by weight per 100 parts by weight of component (A). If the amount is less than 0.01 part by weight, the cure promoting effect becomes insignificant. If the amount exceeds 5 parts by weight, the migrating component increases, with a lowering of residual adhesion rate and a degradation of adhesion being sometimes observable.

Component (C) may be prepared by combining starting reactants such as $M^1_2$, $M^1_2D^1_3$, $M^{1A}_2$, $D^{1A}_4$, and $D^1_4$ wherein $M^1$, $M^{1A}$, $D^1$ and $D^{1A}$ are as defined above in formula (3), effecting equilibration reaction in the presence of an acid or alkali catalyst, and vacuum drying. In the method, an antioxidant is preferably blended. Also preferably strong acids such as trifluoromethanesulfonic acid are used as the catalyst.

[Component (D)]

As the platinum group metal base catalyst (D), any well-known addition reaction catalysts may be used. Such platinum group metal base catalysts include, for example, platinum, palladium, rhodium and ruthenium base catalysts, with the platinum base catalysts being preferred. Examples of the platinum base catalyst include platinum base compounds, complexes of platinum with vinylsiloxanes, alcohol or aldehyde solutions of chloroplatinic acid, complexes of chloroplatinic acid with olefins, and complexes of chloroplatinic acid with vinylsiloxanes.

The amount of component (D) blended is to give 1 to 100 ppm of platinum group metal based on the total weight of the organopolysiloxane composition, i.e., the total weight of components (A) to (D). In conventional organopolysiloxane compositions for release paper or film, the concentration of platinum group metal blended for forming a cured film is typically 60 to 500 ppm by weight based on the composition. In contrast, the amount of the platinum group metal base catalyst blended herein is 1 to 100 ppm of platinum group metal based on the total weight of the organopolysiloxane composition, i.e., the total weight of components (A) to (D), the amount being preferably in the range of 1 to 60 ppm, more preferably 1 to 40 ppm, and most preferably 1 to 30 ppm.

[Component (E)]

Component (E) is an addition reaction inhibitor, which is optional and serves to control the catalytic activity of the platinum group metal base catalyst. Included are organonitrogen compounds, organophosphorus compounds, acetylene compounds, oxime compounds, and organic chlorine compounds. Examples include acetylene alcohols such as 1-ethynyl-1-cyclohexanol, 3-methyl-1-butyn-3-ol, 3,5-dimethyl-1-hexyn-3-ol, 3-methyl-1-pentyne-3-ol, and 2-phenyl-3-butyn-2-ol, acetylene compounds such as 3-methyl-3-penten-1-yne and 3,5-dimethyl-3-hex-1-yne, the reaction products of acetylene compounds with alkoxysilanes, siloxanes or hydrogensilanes, e.g., 1,1-dimethylpropynyloxytrimethylsilane, vinylsiloxanes such as cyclic tetramethylvinylsiloxane, organonitrogen compounds such as benzotriazole, organophosphorus compounds, oxime compounds, maleic acid compounds such as diallyl maleate, and organic chlorine compounds.

When used, the amount of component (E) blended is preferably 0.01 to 5 parts by weight, more preferably 0.1 to 3 parts by weight per 100 parts by weight of component (A).

[Optional Components]

In the organopolysiloxane composition of the invention, any of components which are commonly blended in conventional organopolysiloxane compositions for release paper or film may be blended as long as the benefits of the invention are not impaired. Even when the composition is diluted with an organic solvent, its characteristics are not degraded.

Preferred as the organic solvent used herein are organic solvents (exclusive of siloxane solvents) in which organopolysiloxanes are soluble such as toluene, hexane, xylene, and methyl ethyl ketone (also known as 2-butanone), and organopolysiloxanes (or siloxane solvents) including low-viscosity cyclic siloxanes such as octamethyltetrasiloxane and decamethylpentasiloxane, linear siloxanes such as $M_2D_p$ wherein M and D are as defined above in formula (1), and p is a number of 0 to 200, preferably 1 to 50, and branched siloxanes such as $M_{2+q}D_pT_q$ wherein M, D and T are as defined above in formula (1), p is a number of 0 to 200, preferably 1 to 50, and q is a number of 1 to 10, preferably 1 to 3.

The amount of the organic solvent used is preferably 3 to 50 times, more preferably 8 to 30 times the total weight of the organopolysiloxane as component (A) and the organohydrogenpolysiloxane as component (B).

Other optional additives include high-molecular-weight linear organopolysiloxanes other than components (A) to (C) for imparting lubricity, aryl group-containing silicone resins other than components (A) to (C) for adjusting release force, silicone resins, silica, and low-molecular-weight organopolysiloxanes which are free of silicon-bonded hydrogen and alkenyl.

[Preparation Method]

The organopolysiloxane composition of the invention is obtained by mixing predetermined amounts of components (A) to (D) and if necessary, component (E) and optional components.

The resulting organopolysiloxane composition preferably has a viscosity at 25° C. of 10 to 2,000 mPa·s, more preferably 15 to 1,000 mPa·s as measured by a rotational viscometer.

[Application and Usage]

The organopolysiloxane composition is coated onto a sheet-like substrate such as paper or plastic film by means of a coating roll (e.g., three-roll mill, five-roll mill, gravure roll, offset gravure roll, etc.) and heat cured in a standard way. The sheet-like substrate having a cured silicone film of the organopolysiloxane composition disposed on one surface is advantageously used as a release sheet.

Exemplary paper substrates include glassine paper, polyethylene-laminated paper, polyvinyl alcohol resin-coated paper and clay-coated paper. Exemplary plastic film substrates include films of polyethylene, polypropylene, and polyesters such as polyethylene terephthalate.

The coating weight of the organopolysiloxane composition may be sufficient to form a cured silicone film on the surface of a sheet-like substrate, for example, about 0.1 to 5.0 g/m². An excessive coating weight may rather invite a drop of release performance.

Although the heat curing conditions vary with the type of substrate and the coating weight, a cured film can be formed on a substrate by heating at 80 to 200° C., preferably 100 to 180° C. for 1 to 60 seconds, preferably 2 to 30 seconds.

EXAMPLES

Examples and Comparative Examples are given below for further illustrating the invention although the invention is not limited thereto. It is noted that the Mw is determined by ²⁹Si-NMR, the viscosity is measured at 25° C. by a rotational viscometer, and the kinematic viscosity is measured at 25° C. by an Ostwald viscometer.

[Raw Materials Used]

Component (A)

Methylvinylpolysiloxane (1)

polysiloxane of the following structure having a vinyl value of 0.0166 mol/100 g and a viscosity of 427 mPa·s

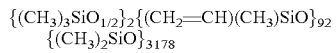

Methylvinylpolysiloxane (2)

polysiloxane of the following structure having a vinyl value of 0.039 mol/100 g and a 30 wt % toluene solution viscosity at 25° C. of 10,000 mPa·s $\{(CH_3)_3SiO_{1/2}\}_2\{(CH_2=CH)(CH_3)SiO\}_{92}$
$\{(CH_3)_2SiO\}_{3178}$ Component (B)

Methylhydrogenpolysiloxane (3)

methylhydrogenpolysiloxane capped with trimethylsiloxy groups at both ends of to the molecular chain, consisting of $(CH_3)HSiO$ units in the entirety other than the both ends, having a Si—H content of 1.61 mol/100 g and a kinematic viscosity of 35 mm²/s Component (C)

polysiloxanes having (meth)acrylic groups on side chains (Examples)

$M^3{}_2D^3{}_{170}D^{3A}{}_{22}$ (4) with Mw 16,526
$M^3{}_3D^3{}_{110}D^{3A}{}_6T^3{}_1$ (5) with Mw 9,482
$M^3{}_3D^3{}_{180}D^{3A}{}_{18}T^3{}_1$ (6) with Mw 16,726
$M^{3A}{}_2D^3{}_{37}D^{3A}{}_8$ (7) with Mw 4,472
$M^3{}_2D^3{}_{20}D^{3A}{}_5$ (8) with Mw 2,502
$M^3{}_2D^3{}_{20}D^{3MA}{}_5$ (9) with Mw 2,516

In the chemical formulae, $M^3$ is $R^7{}_3SiO_{1/2}$, $M^{3A}$ is $R^7{}_2A^1SiO_{1/2}$, $D^3$ is $R^7{}_2SiO_{2/2}$, $D^{3A}$ is $R^7A^1SiO_{2/2}$, $D^{3MA}$ is $R^7(MA)SiO_{2/2}$, $T^3$ is $R^7SiO_{3/2}$, $R^7$ is methyl, $A^1$ is $CH_2=CHCOO(CH_2)_3—$, and MA is $CH_2=CCH_3COO(CH_2)_3—$.

Other Additive Components (Comparative Examples)

$M^{3A}{}_2D^3{}_5$ (10) with Mw 728

In the chemical formula, $M^{3A}$ is $R^7{}_2A^1SiO_{1/2}$, $D^3$ is $R^7{}_2SiO_{2/2}$, $R^7$ is methyl, and $A^1$ is $CH_2=CHCOO(CH_2)_3—$.

tricosaethylene glycol diacrylate (11), both end type diacrylate having 23 ethylene glycol units, with molecular weight 1,108 propoxylated ethoxylated bisphenol A diacrylate (12) with molecular weight 1,296 acrylic acid (13), $HOOCH=CH_2$ with molecular weight 72

Example 1

By combining 100 parts by weight of methylvinylpolysiloxane (1) as component (A) with 1.77 parts by weight of methylhydrogenpolysiloxane (3) as component (B), 1 part by weight of polysiloxane having acrylic groups on side chains: $M^3{}_2D^3{}_{170}D^{3A}{}_{22}$ (4) as component (C), and 0.3 part by weight of 1-ethynyl-1-cyclohexanol as component (E), agitating them until uniform, adding platinum-vinylsiloxane complex as component (D) in such an amount as to give 20 ppm by weight of platinum atom based on the total weight of components (A), (B), (C) and (D), and agitating the contents until uniform, there was prepared an organopolysiloxane composition having a viscosity of 422 mPa·s and a H/Vi (i.e., ratio of Si—H groups in component (B) to alkenyl groups in component (A), the same hereinafter) of 1.71.

Example 2

By following the same procedure as in Example 1 aside from changing component (C) to 1 part by weight of polysiloxane having acrylic groups on side chains: $M^3{}_3D^3{}_{110}D^{3A}{}_6T^3{}_1$ (5), there was prepared an organopolysiloxane composition having a viscosity of 386 mPa·s and a H/Vi of 1.71.

Example 3

By following the same procedure as in Example 1 aside from changing component (C) to 1 part by weight of polysiloxane having acrylic groups on side chains: $M^3{}_3D^3{}_{180}D^{3A}{}_{18}T^3{}_1$ (6), there was prepared an organopolysiloxane composition having a viscosity of 433 mPa·s and a H/Vi of 1.71.

Example 4

By following the same procedure as in Example 1 aside from changing component (C) to 1 part by weight of polysiloxane having acrylic groups on side chains: $M^{3A}{}_2D^3{}_{37}D^{3A}{}_8$ (7), there was prepared an organopolysiloxane composition having a viscosity of 377 mPa·s and a H/Vi of 1.71.

Example 5

By following the same procedure as in Example 1 aside from changing component (C) to 1 part by weight of polysiloxane having acrylic groups on side chains: $M^3{}_2D^3{}_{20}D^{3A}{}_5$ (8), there was prepared an organopolysiloxane composition having a viscosity of 343 mPa·s and a H/Vi of 1.71.

Example 6

By following the same procedure as in Example 1 aside from changing component (C) to 0.5 part by weight of polysiloxane having acrylic groups on side chains: $M^3{}_2D^3{}_{20}D^{3A}{}_5$ (8), there was prepared an organopolysiloxane composition having a viscosity of 344 mPa·s and a H/Vi of 1.71.

Example 7

By following the same procedure as in Example 5 aside from adding the platinum-vinylsiloxane complex as component (D) in such an amount as to give 15 ppm by weight of platinum atom based on the total weight of components (A), (B), (C), (D) and (E), and agitating the contents until uniform, there was prepared an organopolysiloxane composition having a viscosity of 343 mPa·s and a H/Vi of 1.71.

Example 8

By combining 100 parts by weight of methylvinylpolysiloxane (2) as component (A) with 3.46 parts by weight of methylhydrogenpolysiloxane (3) as component (B), 1 part by weight of polysiloxane having acrylic groups on side chains: $M^3{}_2D^3{}_{170}D^{3A}{}_{22}$ (4) as component (C), 1 part by weight of 3-methyl-1-butyn-3-ol as component (E), 1,086 parts by weight of toluene, and 1,086 parts by weight of 2-butanone, agitating them until uniform, adding platinum-vinylsiloxane complex as component (D) in such an amount as to give 20 ppm by weight of platinum atom based on the total weight of components (A), (B), (C), (D) and (E), and agitating the contents until uniform, there was prepared an organopolysiloxane composition having a viscosity of 15 mPa·s and a H/Vi of 1.43.

Example 9

By following the same procedure as in Example 1 aside from changing component (C) to 1 part by weight of polysiloxane having acrylic groups on side chains: $M^3{}_2D^3{}_{20}D^{3MA}{}_5$ (9), there was prepared an organopolysiloxane composition having a viscosity of 344 mPa·s and a H/Vi of 1.71.

Reference Example 1

By combining 100 parts by weight of methylvinylpolysiloxane (1) as component (A) with 1.77 parts by weight of methylhydrogenpolysiloxane (3) as component (B) and 0.3 part by weight of 1-ethynyl-1-cyclohexanol as component (E), agitating them until uniform, adding platinum-vinylsiloxane complex as component (D) in such an amount as to give 100 ppm by weight of platinum atom based on the total weight of components (A), (B), (D) and (E), and agitating the contents until uniform, there was prepared an organopolysiloxane composition having a viscosity of 392 mPa·s and a H/Vi of 1.71.

Comparative Example 1

By combining 100 parts by weight of methylvinylpolysiloxane (1) as component (A) with 1.77 parts by weight of methylhydrogenpolysiloxane (3) as component (B) and 0.3 part by weight of 1-ethynyl-1-cyclohexanol as component (E), agitating them until uniform, adding platinum-vinylsiloxane complex as component (D) in such an amount as to give 20 ppm by weight of platinum atom based on the total weight of components (A), (B), (D) and (E), and agitating the contents until uniform, there was prepared an organopolysiloxane composition having a viscosity of 392 mPa·s and a H/Vi of 1.71.

Comparative Example 2

By following the same procedure as in Comparative Example 1 and adding 1 part by weight of organosiloxane having acrylic groups at both ends: $M^{3A}{}_2D^3{}_5$ (10) as additive component to the composition of Comparative Example 1, there was prepared an organopolysiloxane composition having a viscosity of 386 mPa·s and a H/Vi of 1.71.

Comparative Example 3

By following the same procedure as in Comparative Example 1 and adding 1 part by weight of compound having acrylic groups at both ends: tricosaethylene glycol diacrylate (11) as additive component to the composition of Comparative Example 1, there was prepared an organopolysiloxane composition having a viscosity of 391 mPa·s and a H/Vi of 1.71.

Comparative Example 4

By following the same procedure as in Comparative Example 1 and adding 1 part by weight of compound having acrylic groups at both ends: propoxylated ethoxylated bisphenol A diacrylate (12) as additive component to the composition of Comparative Example 1, there was prepared an organopolysiloxane composition having a viscosity of 393 mPa·s and a H/Vi of 1.71.

Comparative Example 5

By following the same procedure as in Comparative Example 1 and adding 1 part by weight of acrylic acid (13) as additive component to the composition of Comparative Example 1, there was prepared an organopolysiloxane composition having a viscosity of 385 mPa·s and a H/Vi of 1.71.

Comparative Example 6

By removing the polysiloxane having acrylic groups on side chains: $M^3{}_2D^3{}_{170}D^{3A}{}_{22}$ (4) as component (C) from the composition of Example 8, agitating this formulation until uniform, adding platinum-vinylsiloxane complex as component (D) in such an amount as to give 20 ppm by weight of platinum atom based on the total weight of components (A), (B), (D) and (E), and agitating the contents until uniform, there was prepared an organopolysiloxane composition having a viscosity of 14 mPa·s and a H/Vi of 1.43.

The organopolysiloxane compositions obtained in the above Examples were evaluated by the following tests. The test results are tabulated in Tables 1 to 4 along with the formulation.

[Release Force (Solventless Type Release Paper Silicone)]

Examples 1 to 7, Example 9, Reference Example 1 and Comparative Examples 1 to 5

The organopolysiloxane composition was coated on the metal roll of a RI tester (IHI Machinery & Furnace Co., Ltd.), uniformly stretched by rotating two rolls for 45 seconds, and then transferred from the rubber roll to Korean glassine paper ASP (Ahistrom-Munksjo, containing catalyst poison). The Korean glassine paper ASP having the organopolysiloxane composition transferred thereto was heated in a hot air dryer at 120° C. for 30 seconds, completing a release paper bearing a cured film of the composition having a thickness of to 0.9-1.1 g/m². After aging at 25° C. for 24 hours in this state, TESA-7475 tape (Tesa UK Ltd.) was attached to the cured film surface of the release paper (side transferred from the rubber roll), which was cut to a size of 2.5 cm by 18 cm. This test piece was sandwiched between glass plates, and aged at 25° C. under a load of 70 g/cm² and at 70° C. under a load of 20 g/cm² and at room temperature for 24 hours. Thereafter, an end portion of the test piece was detached, and the end portion of the PSA-bearing substrate of the tape was pulled back at a peeling speed of 0.3 m/min at an angle of 180° relative to the glassine paper, during which a force (N/25 mm) required for peeling was measured by a tensile tester (model AGS-50G by Shimadzu Corp.) and reported as "release force."

[Release Force (Solvent Type Release Paper Silicone)]

Example 8 and Comparative Example 6

The organopolysiloxane composition was coated to Korean glassine paper ASP by means of No. 14 bar coater and heated in a hot air dryer at 120° C. for 30 seconds, completing a release paper bearing a cured film of the organopolysiloxane composition having a thickness of 0.9-1.1 g/m². The subsequent evaluation procedure including separator aging and PSA tape treatment was the same as in the above procedure of evaluating the release force of solventless type release paper silicone.

[Residual Adhesion Rate]

The TESA-7475 tape after the measurement of release force was attached to a polyester film and pressed by rolling back and forth a roller of 2 kg one cycle. The assembly was allowed to stand for 30 minutes, an end portion of the TESA-7475 tape was detached, and the end of the tape was peeled at a peeling speed of 0.3 m/min by pulling back at an angle of 180° relative to the polyester film. A force (N/25 mm) required for peeling: release force "A" was measured.

As a blank, virgin TESA-7475 tape was attached to a polyester film and then as above, pressed by rolling back and forth a roller of 2 kg one cycle. The assembly was allowed to stand for 30 minutes, an end portion of the TESA-7475 tape was detached, and the end of the tape was peeled at a peeling speed of 0.3 m/min by pulling back at an angle of 180° relative to the polyester film. A force (N/25 mm) required for peeling: release force "B" was measured. A residual adhesion rate (%) was determined by computing (A/B)×100.

[Cure (Solventless Type Release Paper Silicone)]

Examples 1 to 7, Example 9, Reference Example 1 and Comparative Examples 1 to 5

The organopolysiloxane composition was coated on the metal roll of the tester, uniformly stretched by rotating two rolls (metal and rubber rolls) in contact for 45 seconds, and then transferred from the rubber roll to Korean glassine paper. The polyethylene-laminated paper having the organopolysiloxane composition transferred thereto was heated in a hot air dryer at 120° C. for 30 seconds, completing a release paper bearing a cured film of the composition having a thickness of 0.9-1.1 g/m². Immediately after the release paper was taken out of the dryer, the cured film on its surface was intensely rubbed with the forefinger 10 cycles. With red marker ink applied to the film surface, the ink concentration and the cured film state were observed.

The results are expressed "x" when the finger mark looked dense, "Δ" when the finger mark looked thin, and "○" when the finger mark was substantially unperceived.

[Cure (Solvent Type Release Paper Silicone)]

Example 8 and Comparative Example 6

The organopolysiloxane composition was coated to Korean glassine paper ASP by means of No. 14 bar coater and heated in a hot air dryer at 120° C. for 30 seconds, completing a release paper bearing a cured film of the organopolysiloxane composition having a thickness of 0.9-1.1 g/m². Immediately after the release paper was taken out of the dryer, the cured film on its surface was intensely rubbed with the forefinger 10 cycles. With red marker ink applied to the film surface, the ink concentration and the cured film state were observed. The results are expressed as above.

[Silicone (Organopolysiloxane) Migration]

As in the measurement of release force, a polyethylene terephthalate film of 36 μm thick was laid on the surface of the cured film of the organopolysiloxane composition formed on the surface of Korean glassine paper ASP and press bonded at room temperature under a pressure of 0.98 MPa for 20 hours. Thereafter, the PET film was detached from the cured film. Oily ink (tradename: Magic Ink by Teranishi Chemical Industry Co., Ltd.) was applied to the surface of the PET film which had been in contact with the cured film, silicone migration was evaluated in terms of ink cissing.

The results are expressed "○" for no ink cissing: no or little silicone migration, and "x" for ink cissing: noticeable silicone migration.

TABLE 1

| | Formulation (pbw) | Example 1 | Example 2 | Example 3 | Example 4 |
|---|---|---|---|---|---|
| (A) | methylvinylpolysiloxane (1) | 100 | 100 | 100 | 100 |
| (B) | methylhydrogenpolysiloxane (3) | 1.77 | 1.77 | 1.77 | 1.77 |
| (C) | $M^3{}_3D^3{}_{170}D^{3A}{}_{22}$ (4) | 1 | — | — | — |
| | $M^3{}_3D^3{}_{110}D^{3A}{}_6T^3{}_1$ (5) | — | 1 | — | — |
| | $M^3{}_3D^3{}_{180}D^{3A}{}_{18}T^3{}_1$ (6) | — | — | 1 | — |
| | $M^{3A}{}_2D^3{}_{37}D^{3A}{}_8$ (7) | — | — | — | 1 |
| (D) | platinum-vinylsiloxane complex | 0.8 | 0.8 | 0.8 | 0.8 |
| (E) | 1-ethynyl-1-cyclohexanol | 0.3 | 0.3 | 0.3 | 0.3 |
| | <Pt concentration, ppm> | 20 | 20 | 20 | 20 |
| | <Physical properties> | | | | |
| | H/Vi | 1.71 | 1.71 | 1.71 | 1.71 |
| | <Release properties> | | | | |
| | Release force (N/25 mm) @25° C., 70 g/cm², 24 hr | 0.14 | 0.13 | 0.14 | 0.12 |
| | Release force (N/25 mm) @70° C., 20 g/cm², 24 hr | 0.28 | 0.25 | 0.29 | 0.23 |
| | Residual adhesion rate (%) @25° C., 70 g/cm², 24 hr | 95 | 96 | 95 | 97 |
| | Residual adhesion rate (%) @70° C., 20 g/cm², 24 hr | 96 | 96 | 94 | 97 |
| | Cure | ○ | ○ | ○ | ○ |
| | Silicone migration | ○ | ○ | ○ | ○ |

TABLE 2

| | Formulation (pbw) | Example 5 | Example 6 | Example 7 | Example 8 |
|---|---|---|---|---|---|
| (A) | methylvinylpolysiloxane (1) | 100 | 100 | 100 | — |
| | methylvinylpolysiloxane (2) | — | — | — | 100 |
| (B) | methylhydrogenpolysiloxane (3) | 1.77 | 1.77 | 1.77 | 3.46 |
| (C) | $M^3{}_2D^3{}_{170}D^{3A}{}_{22}$ (4) | — | — | — | 1 |
| | $M^3{}_2D^3{}_{20}D^{3A}{}_5$ (8) | 1 | 0.5 | 1 | — |
| (D) | platinum-vinylsiloxane complex | 0.8 | 0.8 | 0.6 | 0.8 |
| (E) | 1-ethynyl-1-cyclohexanol | 0.3 | 0.3 | 0.3 | — |
| | 3-methyl-1-butyn-3-ol | — | — | — | 1 |
| | toluene | — | — | — | 1,086 |
| | 2-butanone | — | — | — | 1,086 |
| | <Pt concentration, ppm> | 20 | 20 | 15 | 20 |
| | <Physical properties> | | | | |
| | H/Vi | 1.71 | 1.71 | 1.71 | 1.43 |
| | <Release properties> | | | | |
| | Release force (N/25 mm) @25° C., 70 g/cm², 24 hr | 0.12 | 0.14 | 0.14 | 0.15 |
| | Release force (N/25 mm) @70° C., 20 g/cm², 24 hr | 0.22 | 0.27 | 0.29 | 0.35 |
| | Residual adhesion rate (%) @25° C., 70 g/cm², 24 hr | 96 | 96 | 95 | 95 |
| | Residual adhesion rate (%) @70° C., 20 g/cm², 24 hr | 95 | 94 | 94 | 95 |
| | Cure | ○ | ○ | ○ | ○ |
| | Silicone migration | ○ | ○ | ○ | ○ |

TABLE 3

| | Formulation (pbw) | Example 9 | Reference Example 1 |
|---|---|---|---|
| (A) | methylvinylpolysiloxane (1) | 100 | 100 |
| (B) | methylhydrogenpolysiloxane (3) | 1.77 | 1.77 |
| (C) | $M^3{}_2D^3{}_{20}D^{3MA}{}_5$ (9) | 1 | — |
| (D) | platinum-vinylsiloxane complex | 0.8 | 4.0 |
| (E) | 1-ethynyl-1-cyclohexanol | 0.3 | 0.3 |
| | <Pt concentration, ppm> | 20 | 100 |
| | <Physical properties> | | |
| | H/Vi | 1.71 | 1.71 |
| | <Release properties> | | |
| | Release force (N/25 mm) @25° C., 70 g/cm², 24 hr | 0.16 | 0.12 |
| | Release force (N/25 mm) @70° C., 20 g/cm², 24 hr | 0.31 | 0.27 |
| | Residual adhesion rate (%) @25° C., 70 g/cm², 24 hr | 93 | 97 |
| | Residual adhesion rate (%) @70° C., 20 g/cm², 24 hr | 91 | 96 |
| | Cure | ○ | ○ |
| | Silicone migration | ○ | ○ |

TABLE 4

| | Formulation (pbw) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (A) | methylvinylpolysiloxane (1) | 100 | 100 | 100 | 100 | 100 | — |
| | methylvinylpolysiloxane (2) | — | — | — | — | — | 100 |
| (B) | methylhydrogenpolysiloxane (3) | 1.77 | 1.77 | 1.77 | 1.77 | 1.77 | 3.46 |
| (C) | $M^{3.4}_2D^3_5$ (10) | — | 1 | — | — | — | — |
| | tricosaethylene glycol diacrylate (11) | — | — | 1 | — | — | — |
| | propoxylated ethoxylated bisphenol A diacrylate (12) | — | — | — | 1 | — | — |
| | acrylic acid (13) | — | — | — | — | 1 | — |
| (D) | platinum-vinylsiloxane complex | 0.8 | 0.8 | 0.8 | 0.8 | 0.8 | 0.8 |
| (E) | 3-methyl-1-butyn-3-ol | — | — | — | — | — | 1 |
| | 1-ethynyl-1-cyclohexanol | 0.3 | 0.3 | 0.3 | 0.3 | 0.3 | — |
| | toluene | — | — | — | — | — | 1,086 |
| | 2-butanone | — | — | — | — | — | 1,086 |
| | <Pt concentration, ppm> | 20 | 20 | 20 | 20 | 20 | 20 |
| | <Physical properties> | | | | | | |
| | H/Vi | 1.71 | 1.71 | 1.71 | 1.71 | 1.71 | 1.43 |
| | <Release properties> | | | | | | |
| | Release force (N/25 mm) @ 25° C., 70 g/cm², 24 hr | 0.18 | 0.17 | 0.19 | 0.18 | 0.08 | 0.19 |
| | Release force (N/25 mm) @ 70° C., 20 g/cm², 24 hr | 0.39 | 0.31 | 0.32 | 0.35 | 0.45 | 0.78 |
| | Residual adhesion rate (%) @ 25° C., 70 g/cm², 24 hr | 69 | 86 | 84 | 80 | 65 | 73 |
| | Residual adhesion rate (%) @ 70° C., 20 g/cm², 24 hr | 80 | 85 | 81 | 81 | 74 | 71 |
| | Cure | X | X | X | X | X | X |
| | Silicone migration | X | X | X | X | X | X |

Reference Example 1 is a composition consisting of components (A), (B), (D) and (E), but not containing component (C), wherein the platinum concentration of the catalyst as component (D) is as high as 100 ppm. Since cure takes place to a full extent, this composition shows good results of cure and silicone migration, and inherent properties of release paper including a low release force and a high residual adhesion rate are observed.

Comparative Example 1 corresponds to the composition of Reference Example 1 wherein the platinum concentration of the catalyst as component (D) is reduced to ⅕, to that is, 20 ppm. In this case, the silicone (organopolysiloxane composition) does not cure even after 120° C./30 sec heat treatment, and remains oily, indicating insufficient cure. After separator aging at 25° C. for 1 day, the silicone on the coating surface has been cured, but to such an insufficient extent that noticeable finger marks are left after the coating surface is rubbed. Because of a large amount of migration, the cure and silicone migration are rated "x."

Examples 1 to 6 are obtained by blending a minor amount of the polysiloxane having acrylic groups on side chains as component (C) in the composition of Comparative Example 1. Although the platinum concentration of the catalyst as component (D) is 20 ppm, the addition of component (C) ensures a full progress of cure, few finger marks after rubbing of the coating surface, and a minimized amount of silicone migration. With respect to release force and residual adhesion rate, the results are comparable to those of Reference Example 1. It is demonstrated that component (C) enhances cure and allows addition reaction to take place at a low platinum concentration.

Example 7 corresponds to the composition of Example 5 wherein the platinum-vinylsiloxane complex as component (D) is added in an amount of 0.6 part by weight, that is, a platinum concentration of 15 ppm. Cure is good, and the amount of silicone migration is small. With respect to release force and residual adhesion rate, the results are comparable to those of Reference Example 1. A satisfactory cured film is obtained even when the platinum concentration is reduced to 15 ppm.

Comparative Example 2 is a composition obtained by adding 1 part by weight of organosiloxane having acrylic groups at both ends: $M^{3.4}_2D^3_5$ (10) (Mw=728) to the composition of Comparative Example 1. Although the acrylic group-containing siloxane is added, the levels of cure and silicone migration are equivalent to those of Comparative Example 1 because the siloxane is outside the scope of component (C) defined herein. The release force is high as compared with Reference Example 1, and the residual adhesion rate is low.

Comparative Examples 3 to 5 are compositions obtained by adding acrylic compounds to the composition of Comparative Example 1.

Comparative Examples 3 and 4 are compositions obtained by adding acrylic compounds having a molecular weight of at least 1,000. The levels of cure and silicone migration are equivalent to those of Comparative Example 1. The release force is high as compared with Reference Example 1, and the residual adhesion rate is low.

Comparative Example 5 is a composition obtained by adding 1 part by weight of acrylic acid (13) to the composition of Comparative Example 1. The levels of cure and silicone migration are equivalent to those of Comparative Example 1. The silicone does not cure after heat treatment and remains oily, indicating insufficient cure. The release force after attachment of TESA-7475 tape and aging at 25° C. and 70 g/cm² for 24 hours is very low, which is believed attributable to the migration of acrylic acid. The migration is poor and the residual adhesion rate is low.

Comparative Example 6 is the standard composition of solvent type. When the platinum concentration of the catalyst as component (D) is 20 ppm, insufficient cure, a large amount of silicone migration, and a low residual adhesion rate are confirmed.

Example 8 is a composition obtained by adding 1 part by weight of polysiloxane having acrylic groups on side chains: $M^3_2D^3_{170}D^{3.4}_{22}$ (4) as component (C) to the composition of Comparative Example 6. Just because 1 part by weight of $M^3_2D^3_{170}D^{3.4}_{22}$ (4) is added, cure is satisfactory, the amount of silicone migration is reduced, and the residual adhesion rate is at least 20% higher than that of Comparative Example 6 are observed. The release force is lower than in Comparative Example 6.

It is evident from the above results that the composition in which a minor amount of an organopolysiloxane compound having at least three (meth)acrylic groups per molecule and a weight average molecular weight of at least 1,000 is blended, although the platinum group metal base catalyst as component (D) is at a low platinum concentration of 15 to 20 ppm, shows satisfactory cure and release properties equivalent to those on curing at 100 ppm.

The invention claimed is:

1. An organopolysiloxane composition for release paper or release film consisting of the following components (A) to (D):
   (A) an organopolysiloxane having at least two silicon-bonded alkenyl groups per molecule, but not at least three (meth)acrylic groups,
   (B) an organohydrogenpolysiloxane having on the average at least two silicon-bonded hydrogen atoms (i.e., Si—H groups) per molecule, but not at least three (meth)acrylic groups, in such an amount that the moles of Si—H groups in component (B) is 1 to 5 times the moles of alkenyl groups in component (A),
   (C) an organopolysiloxane compound having at least three (meth)acrylic groups per molecule and represented by the general formula (3)

   $$M^1_a M^{1A}_b D^1_c D^{1A}_d T^1_e T^{1A}_f Q^1_g \quad (3)$$

wherein $M^1$ is $R^1_3SiO_{1/2}$, $M^{1A}$ is $R^1_2ASiO_{1/2}$, $D^1$ is $R^2SiO_{2/2}$, $D^{1A}$ is $R^1ASiO_{2/2}$, $T^1$ is $R^1SiO_{3/2}$, $T^{1A}$ is $ASiO_{3/2}$, and $Q^1$ is $SiO_{4/2}$,
   $R^1$ is each independently a $C^1$-$C^{18}$ unsubstituted or substituted monovalent hydrocarbon group, or alkoxy group, hydroxy group, epoxy group, or polyoxyalkylene group,
   wherein in the groups $R^1_2ASiO_{1/2}$, $R^1ASiO_{2/2}$, and $ASiO_{3/2}$, A is $CH_2$=$CR^2COR^3$—,
   $R^2$ is hydrogen or methyl,
   $R^3$ is $OR^4$ or $R^4$,
   $R^4$ is a $C_1$-$C_{20}$ divalent group which may have a branched or cyclic structure and may contain an epoxy group, ester bond, urethane bond, ether bond, isocyanate bond, or hydroxy group,
   the subscript a is an integer of 0 to 10,
   the subscript b is an integer of 0 to 5, wherein b is an integer of 2 to 5 when a is 0, and b is an integer of 1 to 5 when a is 1,
   the subscript c is an integer of 5 to 300,
   the subscript d is an integer of 3 to 200,
   the subscripts e and f each are an integer of 0 to 10, and the subscript g is 0 or 1; and
   wherein the organopolysiloxane compound has a weight average molecular weight of at least 1,000, in an amount of 0.01 to 5 parts by weight per 100 parts by weight of component (A), and
   (D) a platinum group metal base catalyst in an amount to give a platinum concentration of 1 to 100 ppm by weight based on the total weight of components (A), (B), (C), and (D), and optionally further consisting of one or more of:
   (E) a reaction inhibitor,
   organic solvent,
   aryl group-containing silicone resins other than components (A) to (C), and silica.

2. The organopolysiloxane composition of claim 1, which contains (E) 0.01 to 5 parts by weight of said reaction inhibitor per 100 parts by weight of component (A).

3. The organopolysiloxane composition of claim 1, wherein component (C) is an organopolysiloxane compound having at least three (meth)acrylic groups on side chains.

4. The organopolysiloxane composition of claim 1, wherein component (C) is an organopolysiloxane compound having at least five (meth)acrylic groups per molecule.

5. The organopolysiloxane composition of claim 1, wherein the platinum group metal base catalyst (D) is contained in an amount to give a platinum concentration of 1 to 60 ppm by weight based on a total weight of components (A), (B), (C), and (D).

6. The organopolysiloxane composition of claim 1, wherein the platinum group metal base catalyst (D) is contained in an amount to give a platinum concentration of 1 to 40 ppm by weight based on a total weight of components (A), (B), (C), and (D).

7. The organopolysiloxane composition of claim 1, wherein the platinum group metal base catalyst (D) is contained in an amount to give a platinum concentration of 1 to 30 ppm by weight based on a total weight of components (A), (B), (C), and (D).

* * * * *